(12) United States Patent
Hooijen et al.

(10) Patent No.: US 6,679,371 B2
(45) Date of Patent: Jan. 20, 2004

(54) VEHICLE COMPRISING LOADING AND UNLOADING APPARATUS

(75) Inventors: Josephus Franciscus Adrianus Hooijen, Bladel (NL); Petrus Adrianus Wilhelmus Gerardus Huijbers, Bladel (NL); Petrus Martinus Johannes Ida Spooren, Berlicum (NL)

(73) Assignee: S.P.H. Speciale Produkten Huijbers-Hooijen B.V., RS Reusel (NL)

( * ) Notice: Subject to any disclaimer, the term of this patent is extended or adjusted under 35 U.S.C. 154(b) by 0 days.

(21) Appl. No.: 10/258,523
(22) PCT Filed: Apr. 18, 2001
(86) PCT No.: PCT/NL01/00309
  § 371 (c)(1),
  (2), (4) Date: Apr. 14, 2003
(87) PCT Pub. No.: WO01/81116
  PCT Pub. Date: Nov. 1, 2001

(65) Prior Publication Data
  US 2003/0159902 A1 Aug. 28, 2003

(30) Foreign Application Priority Data
  Apr. 27, 2000 (NL) .............................................. 1015031

(51) Int. Cl.$^7$ .............................................. B65G 25/04
(52) U.S. Cl. ..................... 198/750.1; 414/499; 414/510
(58) Field of Search .......... 198/750.1, 750.2, 198/750.8, 832, 834; 414/499, 500, 510, 521, 525.1, 525.2

(56) References Cited

U.S. PATENT DOCUMENTS

| | | | | |
|---|---|---|---|---|
| 3,888,366 A | * | 6/1975 | Prahst | 198/750.1 |
| 4,204,592 A | | 5/1980 | Lutz et al. | 198/750.1 |
| 4,927,316 A | * | 5/1990 | Kordel | 414/510 |
| 5,944,472 A | * | 8/1999 | Scofield | 414/521 |
| 6,129,500 A | * | 10/2000 | Doyon | 414/510 |
| 6,367,615 B1 | * | 4/2002 | Helmner | 198/750.1 |

FOREIGN PATENT DOCUMENTS

| | | |
|---|---|---|
| JP | 58 053527 | 3/1983 |
| JP | 5 330376 | 12/1993 |
| NL | 1004 671 | 6/1998 |

* cited by examiner

Primary Examiner—James R. Bidwell
(74) Attorney, Agent, or Firm—Oblon, Spivak, McClelland, Maier & Neustadt, P.C.

(57) ABSTRACT

A vehicle including loading and unloading apparatus, which includes a loading platform that can be moved by a driving mechanism. The loading platform includes an endless belt, which is passed over support rollers, and a head partition extending substantially transversely to the flexible belt, which is connected to the belt. The belt can be moved forwards and backwards by a further driving mechanism. The further driving mechanism includes a rack extending parallel to the longitudinal direction of the belt, which rack is connected to a wall of the vehicle, and a pinion that meshes with the rack, which pinion can be rotated by a motor mounted on the head partition. The rack is disposed under the loading platform, whereby the pinion meshes with the rack along a side edge of the endless belt.

8 Claims, 2 Drawing Sheets

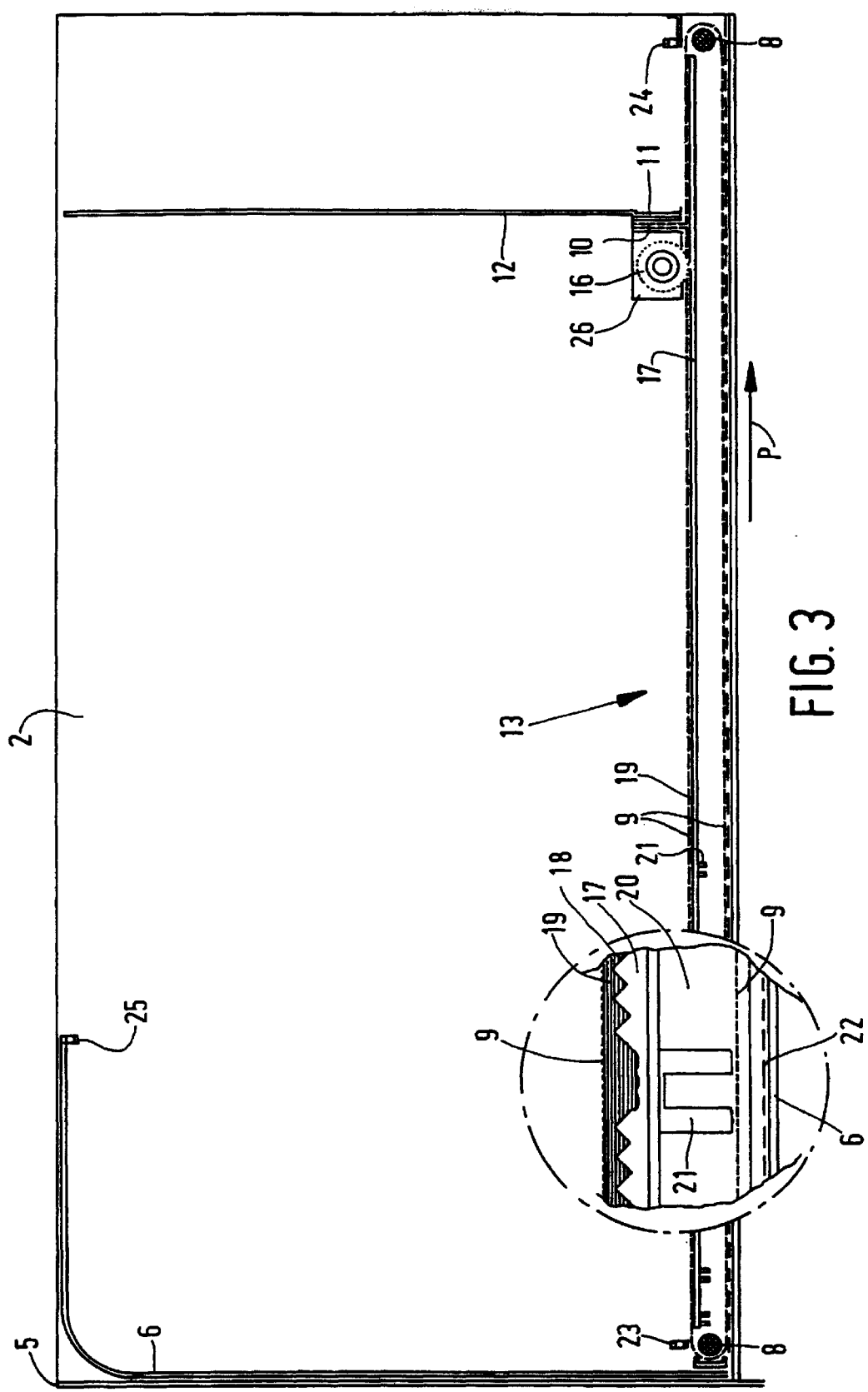

VEHICLE COMPRISING LOADING AND UNLOADING APPARATUS

The invention relates to a vehicle comprising loading and unloading apparatus, which comprises a loading platform which can be moved by driving means, wherein the loading platform comprises an endless belt which is passed over support rollers, and a head partition extending substantially transversely to the flexible belt, which is connected to said belt, which belt can be moved forwards and backwards by driving means, wherein said driving means include a rack extending parallel to the longitudinal direction of the belt, which rack is connected to a wall of the vehicle, and a pinion which meshes with said rack, which pinion can be rotated by means of a motor which is mounted on said head partition.

With a vehicle of this kind, which is known form Dutch patent NL-C-1004671, the head partition is moved in two opposite directions by driving and rotating the pinion in clockwise or anti-clockwise direction. When the head partition is moved, also the endless belt that is connected to the head partition is moved. One advantage of driving the head partition by means of said rack-and-pinion drive is that it is possible to determine the position of the head partition with respect to the vehicle in a simple manner, for example from the number of revolutions of the pinion.

The advantage of such a movable loading platform is that the cargo can be moved into and out of the vehicle in a simple manner when loading and unloading the vehicle.

With the vehicle that is known from Dutch patent NL-C-1004671, the rack is disposed above the belt that forms the loading platform, wherein the teeth of the rack extend downwards and wherein the pinion meshes with said teeth from a position located thereunder.

One drawback of such an arrangement is the fact that when the cargo, for example boxes, is placed on the loading platform, said boxes may partially extend under said rack, as a consequence of which such a box interferes with the rotation of the pinion over the rack. In addition, the rack projects some distance into the cargo space from the side wall, which has a negative effect on the amount of space that is available between the side walls for receiving cargo.

Moreover, the presence of the projecting rack involves the risk of the cargo and/or the rack being damaged upon loading.

The object of the invention is to provide a vehicle wherein the aforesaid drawbacks are avoided.

This objective is accomplished with the vehicle according to the invention, in that the rack is disposed under the loading platform, whereby the pinion meshes with the rack along a side edge of the endless belt.

By having the rack extend under the belt that forms the loading platform, the rack is no longer present in the space that is available for receiving cargo, as a result of which the entire space that is present between the side walls is available for receiving cargo.

One embodiment of the vehicle according to the invention is characterized in that a rack and a pinion that meshes with said rack are disposed on either side of the endless belt.

Since a rack is disposed on either longitudinal side of the endless belt, the forces that occur upon movement of the head partition are distributed evenly over the two side walls of the vehicle.

Another embodiment of the vehicle according to the invention is characterized in that the belt is attached to both sides of the head partition with its ends.

Thus, a connection between the belt and the head partition is obtained in a simple manner whilst at the same time the endless belt is formed.

The invention will now be explained in more detail with reference to the drawings, wherein:

FIG. 3 is a detailed side view of the loading and unloading apparatus that is shown in FIG. 1.

Parts corresponding to each other are indicated by the same numerals in the figures.

Figure 1:
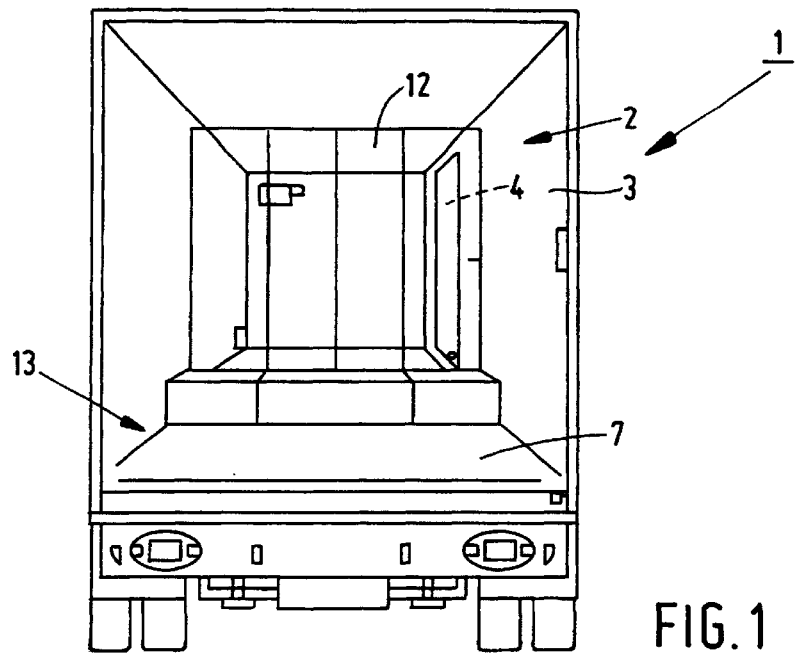
FIG. 1 is a perspective rear view of the vehicle according to the invention.
Figure 2:
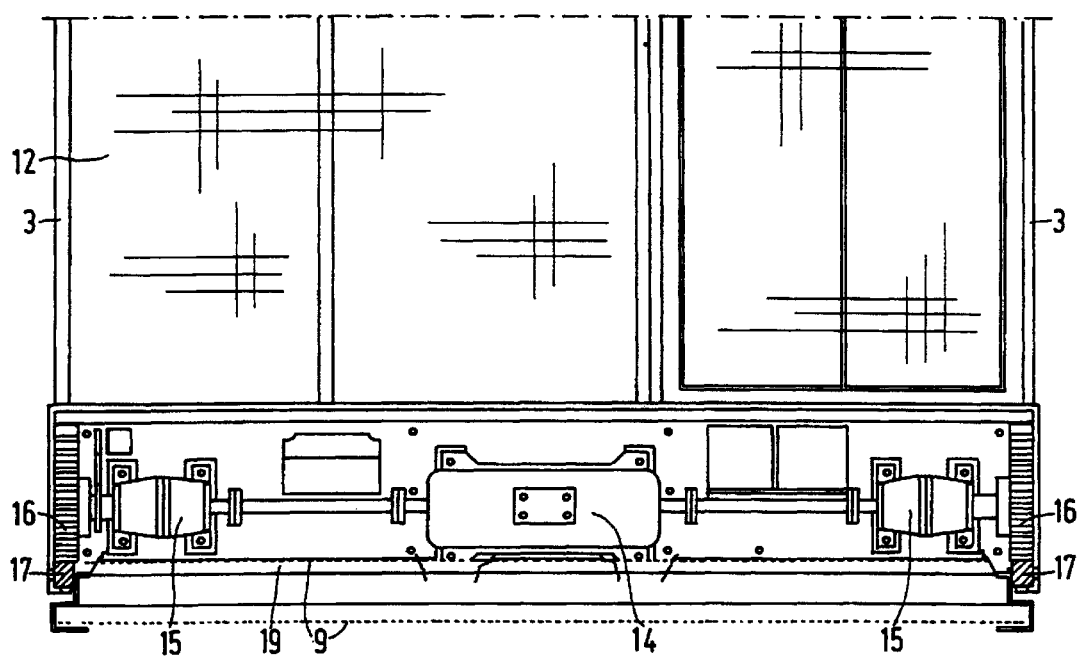
FIG. 2 is an enlarged rear view of a loading and unloading apparatus of the vehicle of FIG. 1.

FIGS. 1–3 show a vehicle according to the invention, which comprises a loading space 2 that is bounded by walls. Loading space 2 includes a door 4 in a side wall 3 and a roller door 6 (FIG. 3) in rear wall 5.

The bottom 7 of the loading space includes a belt 9 which is passed over support rollers 8, which belt is attached to either side of a head partition 12 extending transversely to belt 9.

Support rollers 8, endless belt 9 and head partition 12 form a loading and unloading apparatus 13.

Loading and unloading apparatus 13 furthermore comprises a motor 14, which is mounted on head partition 12, and pinions 16, which are coupled to the motor 14 on either side via transmissions 15. Each pinion 16 meshes with a rack 17 that is mounted on the side wall 3 of loading space 2. The racks 17 that are disposed on either side of belt 9 have teeth 18 which extend in upward direction. Pinion 16 meshes with rack 17 from the upper side, along the side edge of belt 9. Between the two racks 17, belt 9 is supported by a guide plate 19, which extends along the entire length of the vehicle 1. Guide plate 19 is supported on a bottom side by longitudinal beams 20 and cross beams of the vehicle.

The loading and unloading apparatus 13 can be mounted directly on the bottom 7 of the vehicle chassis. In order to protect the belt 9, which is disposed under guide plate 19, against splashing water, a mat 22, for example of polyester, is disposed between bottom 7 and belt 9.

By driving the pinions 16 by means of motor 14, the head partition 12 and the belt 9 that is attached thereto are moved in the direction indicated by arrow P or in a direction opposite thereto. When loading is started, head partition 12 is positioned near rear wall 5. Then the cargo to be transported is placed onto belt 9, whereby head partition 12 is gradually moved, along with belt 9, in the opposite direction of arrow P towards the front side of vehicle 1. Upon unloading of the cargo, the head partition 12 is moved, along with belt 9, in the direction indicated by arrow P, as a result of which the cargo can easily be removed from loading space 2 via the rear side. The position of head partition 12 with respect to the loading space 2 can be determined at any time, for example from the number of revolutions that the pinion has made.

FIG. 3 is a detailed side view of the loading and unloading apparatus 13. The belt 9, which is passed over support rollers 8, is clamped between two metal plates (not shown) with each end 10, 11 thereof. A number of bolts are passed through the parallel sets of plates, by means of which said sets of plates can be moved towards each other so as to tension the endless belt 9. Head partition 12 may be made of lock-woven mesh, for example.

It is possible to move the head partition 12 no further than an intermediate position between rollers 8 upon loading. In said intermediate position, it is possible to place cargo, such as boxes, onto the belt 9 via the door 4 in side walls 3 as well. When using the vehicle 1, goods to be delivered, such as parcels or boxes, can be removed from the loading space 2 via the rear wall 5, whilst goods to be collected, such as parcels and boxes, can be placed onto the belt 9 via the door 4 on the other side of the head partition 12.

Vehicle 1 is furthermore fitted with a number of sensors 23, 24, 25, which are located near rear wall 5, near the front side facing away from the rear wall 5, and near the upper side, respectively. Sensor 23 functions to stop the motor 14 the moment objects are present in front of sensor 23, for example the cargo that is present on belt 9 or the housing 26 of motor 14 and transmission 15. Sensor 24 functions to stop the motor 14 the moment the sensor detects the presence of cargo on belt 9 or the presence of head partition 12. Sensors 23, 24 thus ensure that forward and backward movement of the head partition 12 is only possible between rollers 8. In addition, cargo present on belt 9 is thus prevented from falling off the belt 9 undesirably or being crushed undesirably between the head partition 12 and the front wall at the front side.

Height sensor 25 ensures that the cargo that is present on belt 9 will not extend beyond a predetermined height.

What is claimed is:

1. A vehicle comprising loading and unloading apparatus, which comprises a loading platform which can be moved by driving means, wherein the loading platform comprises an endless belt which is passed over support rollers, and a head partition extending substantially transversely to the flexible belt, which is connected to said belt, which belt can be moved forwards and backwards by driving means, wherein said driving means include a rack extending parallel to the longitudinal direction of the belt, which rack is connected to a wall of the vehicle, and a pinion which meshes with said rack, which pinion can be rotated by means of a motor which is mounted on said head partition, wherein the rack is disposed under the loading platform, whereby the pinion meshes with the rack along a side edge of the endless belt.

2. A vehicle according to claim 1, further comprising a rack and a pinion that meshes with said rack disposed on either side of the endless belt.

3. Apparatus according to claim 1, wherein the belt is attached to both sides of the head partition with its ends.

4. Apparatus according to claim 1, wherein said loading and unloading apparatus comprises an intermediate position stop, whereby it is possible in use to place cargo on the loading platform on either side of the head partition in said intermediate position.

5. Apparatus according to claim 2, wherein the belt is attached to both sides of the head partition with its ends.

6. Apparatus according to claim 2, wherein said loading and unloading apparatus comprises an intermediate position stop, whereby it is possible in use to place cargo on the loading platform on either side of the head partition in said intermediate position.

7. Apparatus according to claim 3, wherein said loading and unloading apparatus comprises an intermediate position stop, whereby it is possible in use to place cargo on the loading platform on either side of the head partition in said intermediate position.

8. Apparatus according to claim 4, wherein said loading and unloading apparatus comprises an intermediate position stop, whereby it is possible in use to place cargo on the loading platform on either side of the head partition in said intermediate position.

* * * * *